United States Patent
Kusumoto et al.

(10) Patent No.: US 7,221,849 B2
(45) Date of Patent: May 22, 2007

(54) RECORDING/REPRODUCING APPARATUS AND METHOD WITH RECORD PROGRAMMING FUNCTION

(75) Inventors: Tatsuji Kusumoto, Fussa (JP); Hideo Kataoka, Tokyo (JP); Kazuya Fujita, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1135 days.

(21) Appl. No.: 10/158,394

(22) Filed: May 31, 2002

(65) Prior Publication Data
US 2002/0164150 A1 Nov. 7, 2002

Related U.S. Application Data

(63) Continuation of application No. PCT/JP01/08547, filed on Sep. 28, 2001.

(30) Foreign Application Priority Data
Oct. 2, 2000 (JP) .......................... 2000-302662

(51) Int. Cl.
H04N 5/76 (2006.01)
(52) U.S. Cl. ......................... 386/46; 386/83
(58) Field of Classification Search ................ 386/1, 386/4, 33, 39, 45, 46, 52, 54, 83, 94, 111, 386/112, 125, 126
See application file for complete search history.

(56) References Cited

U.S. PATENT DOCUMENTS

6,434,323 B1 * 8/2002 Hayashi ...................... 386/104
6,597,862 B1 * 7/2003 Saeki et al. .................. 386/125

FOREIGN PATENT DOCUMENTS

| EP | 0 665 551 A1 | 8/1995 |
| EP | 0 973 333 A2 | 1/2000 |
| JP | 7-14369 | 1/1995 |
| JP | 11-339342 | 12/1999 |
| JP | 2000-41210 | 2/2000 |
| WO | WO 00/36834 | 6/2000 |

* cited by examiner

Primary Examiner—Thai Q. Tran
Assistant Examiner—Mishawn Dunn
(74) Attorney, Agent, or Firm—Pillsbury Winthrop Shaw Pittman, LLP

(57) ABSTRACT

Input programming data items are recorded into a memory contained in an apparatus. That one of the programming data items recorded in the memory, which is requested to be recorded in a recording medium, is read from the memory, transferred to the recording medium and recorded thereon. Programming data for usual record programming and for record programming using a specified recording medium can be managed in a centralized manner by referring to the programming data items recorded in the memory.

1 Claim, 6 Drawing Sheets

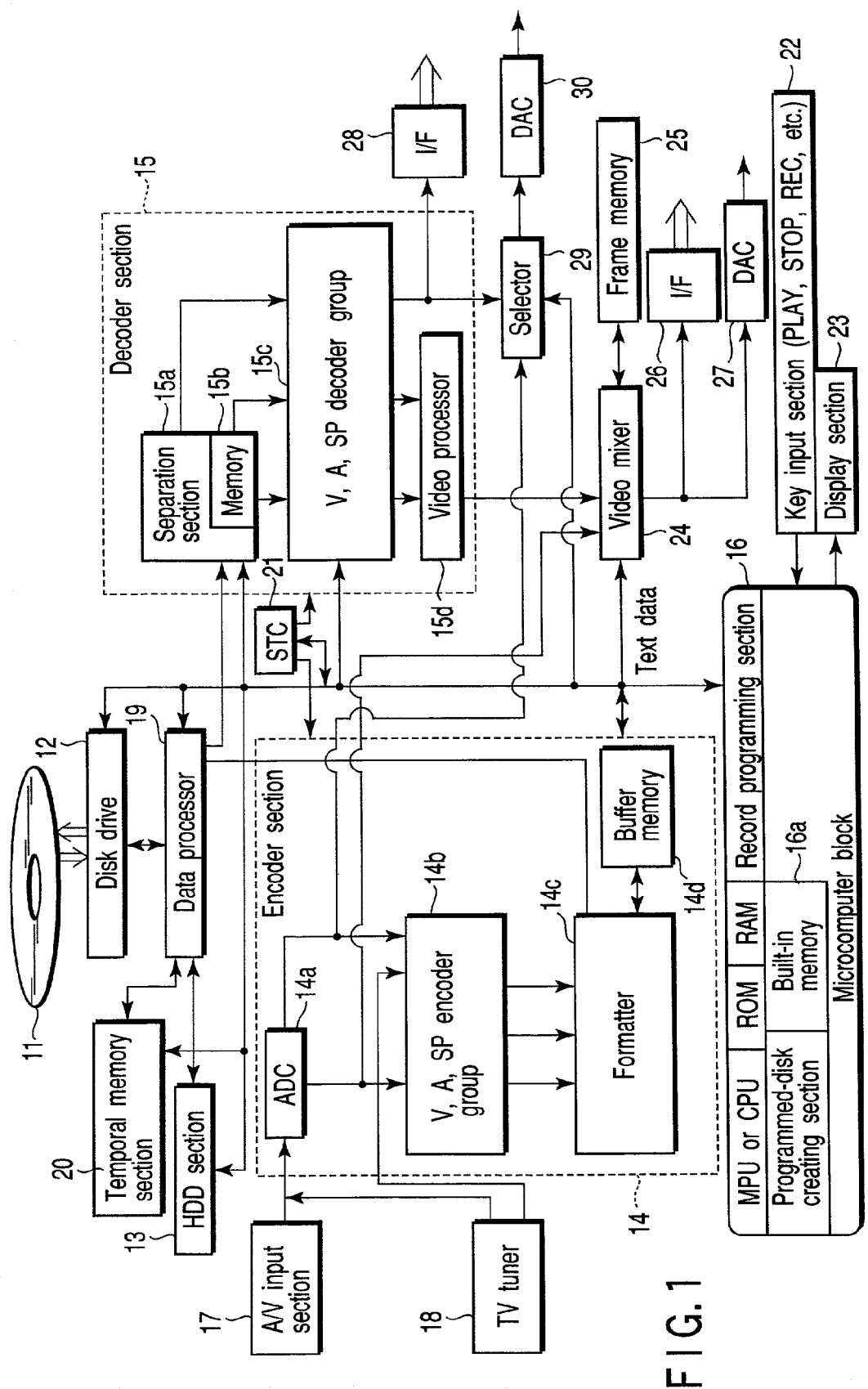
F I G. 1

Record programming list

| CH | Recording day | Record start Hrs. | Record start Min. | Record End Hrs. | Record End Min. | Image quality | Record rate | Voice quality | Recording medium | RS |
|---|---|---|---|---|---|---|---|---|---|---|
| BS15 | Mon. | PM07 | 30 | PM08 | 00 | MN | 6.0 | DB-S | DVD | Off |
| 10 | 04/18 | PM07 | 00 | PM09 | 30 | SP | 5.0 | DB-S | HDD | On |
| 8 | 04/19 | PM07 | 00 | PM09 | 30 | SP | 5.0 | DB-S | HDD | On |
| 6 | 04/20 | PM07 | 00 | PM09 | 30 | SP | 5.0 | DB-S | HDD | On |
| 1 | Every day | AM08 | 15 | AM08 | 30 | LP | 2.4 | DB-S | DVD | Off |
| 4 | 04/28 | PM10 | 00 | PM11 | 00 | SP | 5.0 | DB-S | DVD | On |
| 12 | 04/30 | AM10 | 30 | AM11 | 00 | MN | 6.4 | PCM | HDD | Off |
| 3 | Mon/sat. | AM00 | 30 | AM00 | 20 | LP | 2.4 | DB-S | HDD | On |

F I G. 4

RECORDING/REPRODUCING APPARATUS AND METHOD WITH RECORD PROGRAMMING FUNCTION

CROSS REFERENCE TO RELATED APPLICATIONS

This is a Continuation Application of PCT Application No. PCT/JP01/08547, filed Sep. 28, 2001, which was not published under PCT Article 21 (2) in English.

This application is based upon and claims the benefit of priority from the prior Japanese Patent Applications No. 2000-302662, filed Oct. 2, 2000, the entire contents of which are incorporated herein by reference.

BACKGROUND OF THE INVENTION

1. Field of the Invention

This invention relates to a recording/reproducing apparatus and method capable of simultaneously handling a recording medium attachable to and detachable from the apparatus, such as an optical disk, and a recording medium installed in the apparatus, such as a hard disk, and more particularly to an improvement of an apparatus equipped with a record programming function.

2. Description of the Related Art

As is well known, recording/reproducing apparatuses have recently been developed, which can simultaneously deal with a recording medium attachable to and detachable from the apparatus, like an optical disk such as a DVD (Digital Versatile Disk)-RAM (Random Access Memory) or a DVD-RW (Re Writable), and a recording medium, such as a hard disk, installed in the apparatus, capable of high-speed recording/reproduction and having a large memory capacity.

Recording/reproducing apparatuses of this type have a possibility of providing users with various functions that could not be realized by conventional recording/reproducing apparatuses, by combining the merits of optical disks with those of hard disks. In light of this, there is a strong demand for improving the recording/reproducing apparatuses so as to make them more convenient and problem-free.

For example, there is a conventional function called "record programming", for recording information in a recording medium. As is widely used, this record programming function is used to preset, before a to-be-recorded program is broadcasted, programming data indicative of the date, time, channel and record mode, etc., of a program to be broadcasted. As a result, the program can be automatically recorded.

Further, in a recording/reproducing apparatus using a rewritable optical disk as a recording medium, a disk programming function has recently been provided. If programming data is transferred to and recorded on the optical disk so as to make it serve as a programmed disk, using the disk programming function, the programmed disk can execute only recording based on the recorded programming data.

This disk programming function prevents a program other than that intended to be recorded on the disk, from being recorded. Therefore, when, for example, a serial drama is to be recorded on a single optical disk, the management of the optical disk is facilitated, which enables users to easily create an original disk for themselves.

However, in a conventional recording/reproducing apparatus with the above-described disk programming function, programming data set by a user does not remain after it is transferred to and recorded on an optical disk. Accordingly, in order to confirm the contents of the programming data recorded on the programmed disk, it is necessary to insert the programmed disk into the recording/reproducing apparatus and read the programming data.

On the other hand, the built-in memory of a recording/reproducing apparatus records therein programming data that is input for purposes other than to be transferred to an optical disk so as to make it serve as a programmed disk, i.e., programming data which does not designate an optical disk on which a program is to be recorded, and which is input for the purpose of executing so-called usual record programming. Accordingly, the contents of this programming data can be confirmed by reading it from the built-in memory.

In other words, in the conventional recording/reproducing apparatus, since programming data for usual record programming, and that for record programming using a programmed disk are recorded in different memory mediums, the user has to manage the programming data items individually. This structure makes the operation complicated and hence is not suitable for practical use.

The present invention has been developed in light of the above circumstances, and aims to provide a recording/reproducing apparatus and method using a record programming function that enables the user to simultaneously manage both programming data for usual record programming, and that for record programming designating a programmed disk, thereby facilitating the management by the user.

BRIEF SUMMARY OF THE INVENTION

A recording/reproducing apparatus having a record programming function, according to the invention, is directed to an apparatus with a record programming function for recording a broadcasting program on a recording medium on the basis of input programming data, the input programming data being recorded on the recording medium, thereby making the recording medium to be dedicated to record programming based on the recorded programming data.

The apparatus comprises a programming data recording section for recording input programming data items in a memory contained in the apparatus; and a programming data record control section for reading that one of the programming data items recorded in the memory by the programming data recording section, which is requested to be recorded onto the recording medium, thereby transferring it to the recording medium and recording it thereon, the programming data item read from the memory and transferred onto the recording medium by the programming data record control section being also maintained in the memory.

Further, a recording/reproducing method according to the invention is directed to a method having a record programming function for recording a broadcasting program on a recording medium on the basis of input programming data, the input programming data being recorded on the recording medium, thereby making the recording medium to be dedicated to record programming based on the recorded programming data.

The method comprises a programming data recording step of recording input programming data items into a memory contained in the apparatus; and a programming data record control step of reading that one of the programming data items recorded in the memory at the programming data recording step, which is requested to be recorded onto the recording medium, thereby transferring it to the recording medium and recording it thereon, the programming data item read from the memory and transferred onto the recording medium at the programming data record control step being also maintained in the memory.

In the above-described structure and method, input programming data is stored in a built-in memory, and is maintained in the memory even after it is read from the memory, transferred to the recording medium, and recorded thereon.

Accordingly, programming data recorded on the recording medium can be confirmed as well as programming data used for usual record programming, which enables programming data to be managed in a centralized manner, and hence which is convenient for users.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram useful in explaining a recording/reproducing apparatus equipped with a record programming function according to an embodiment of the invention;

FIG. 4 is a view useful in explaining an example of a programming data list employed in the embodiment;

DETAILED DESCRIPTION OF THE INVENTION

Figure 2:
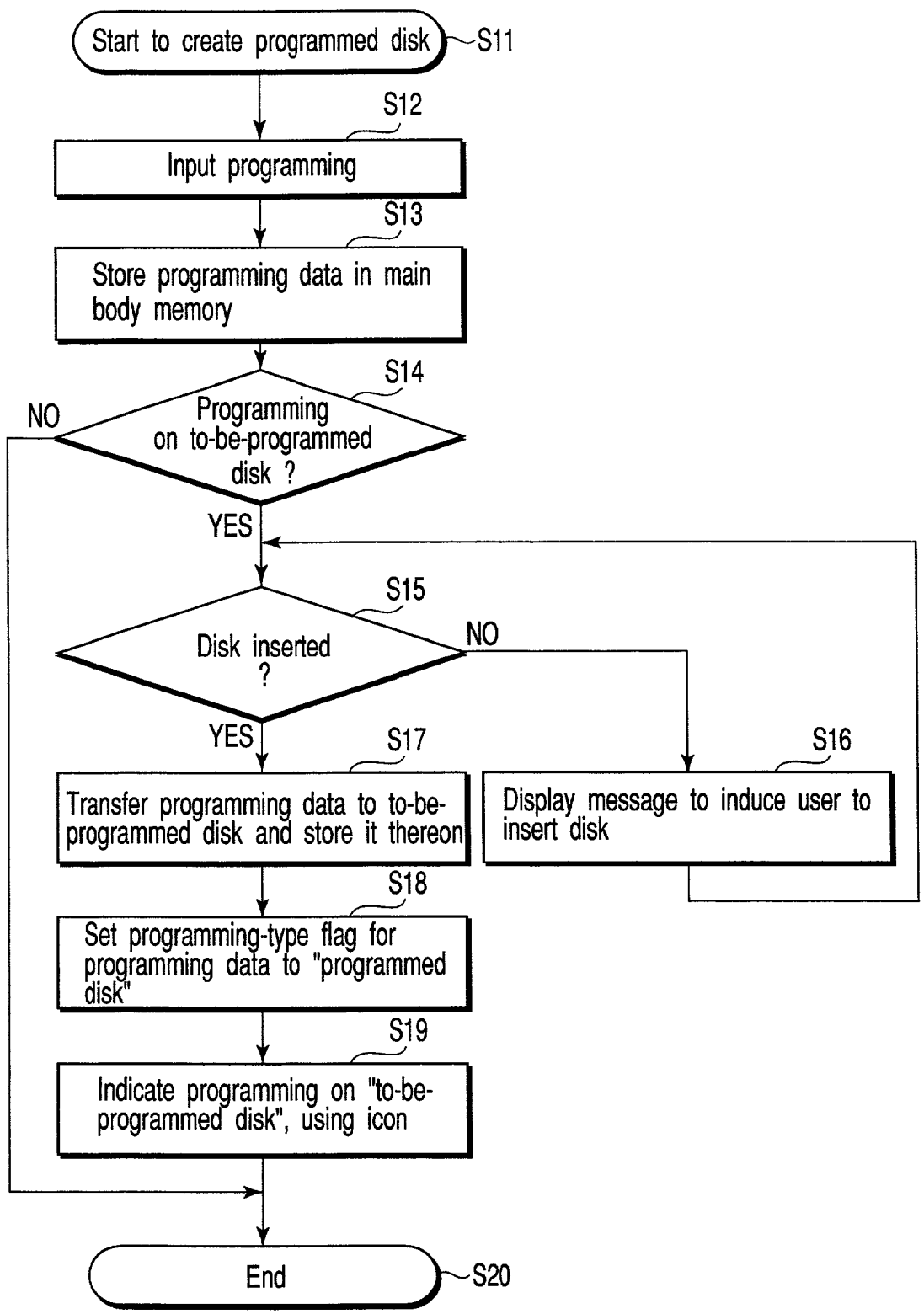
FIG. 2 is a flowchart useful in explaining an operation for creating a programmed disk in the embodiment.

An embodiment of the invention will be described in detail with reference to the accompanying drawings. FIG. 1 schematically shows the structure of a recording/reproducing apparatus according to the embodiment.

This recording/reproducing apparatus mainly comprises a disk drive 12 for spinning an optical disk 11 such as a DVD-RAM, DVD-RW, etc., thereby writing and reading data to and from the optical disk 11; HDD (Hard Disk Drive) section 13 for spinning a hard disk, thereby writing and reading data to and from the hard disk; encoder section 14 forming a recording side; decoder section 15 forming a reproduction side; and microcomputer block 16 for controlling all operations of the recording/reproducing apparatus.

The encoder section 14 is provided with an ADC (Analog to Digital Converter) 14a, encoder group 14b including V (Video) encoder, an A (Audio) encoder and SP (Sub-Picture) encoder, formatter 14c for converting the output of each encoder of the encoder group 14b into a predetermined format, and buffer memory 14d used for the working of the formatter 14c.

The ADC 14a receives external analog image and audio signals output from an A/V (Audio/Video) input section 17, or analog image and audio signals output from a TV (Television) tuner 18.

The ADC 14a digitizes an input analog image signal, using, for example, a sampling frequency of 13.5 MHz and a quantization bit number of eight bits.

In other words, a luminance component Y, color-difference component Cr (or Y-R) and color-difference component Cb (or Y-B) are quantized into eight bits.

Similarly, the ADC 14a digitizes an input analog audio signal, using, for example, a sampling frequency of 48 kHz and a quantization bit number of sixteen bits.

Furthermore, when the ADC 14a receives a digital image or audio signal, they are passed straight through. In addition, these digital image or audio signals may be subjected to a jitter reduction process or sampling-rate changing process, without changing the contents.

The digital image signal output from the ADC 14a is supplied to the formatter 14c via the V encoder of the encoder group 14b.

Further, the digital audio signal output from the ADC 14a is supplied to the formatter 14c via the A encoder of the encoder group 14b.

The V encoder has a function for converting an input digital image signal into a digital image signal compressed at a variable bit rate, on the basis of MPEG (Moving Picture Image Coding Experts Group) 2 or MPEG 1.

The A encoder has a function for converting an input digital audio signal into a digital audio signal compressed at a fixed bit rate or a digital audio signal of linear PCM (Pulse Code Modulation), on the basis of MPEG or AC (Audio Compression) 3.

When a sub-picture (SP) signal has been input from the A/V input section 17 (for example, a signal from a DVD video player with an output terminal dedicated to sub-picture signals), or when a DVD video signal of such a data structure has been broadcasted and received by the TV tuner 18, a sub-picture signal contained in the DVD video signal is input to the SP encoder of the encoder group 14b. The sub-picture signal input to the SP encoder is arranged into a predetermined signal form and supplied to the formatter 14c.

The formatter 14c executes, using the buffer memory 14d as a work area, predetermined signal processing on the input digital image, audio, or sub-picture signal, so that the signal is converted into a format suitable for recording, and outputs it to a data processor 19.

The information encoded by the encoder section 14, or created management information can be recorded on the optical disk 11 via the data processor 19 and disk drive 12.

In the recording/reproducing apparatus, information encoded by the encoder section 14 as described above, or created management information can also be supplied to the HDD section 13 via the data processor 19, and be recorded on its hard disk.

Further, information recorded on the hard disk can be read by the HDD section 13, and be recorded on the optical disk 11 via the data processor 19 and disk drive 12.

If the format of information stored in the hard disk is the same as the data format of the optical disk 11, information read from the hard disk is directly recorded on the optical disk 11.

If, on the other hand, the format of information stored in the hard disk differs from the data format of the optical disk 11, information read from the hard disk is once supplied to the encoder section 14, where it is encoded so that it becomes compatible with the data format of the optical disk 11. After that, the signal is recorded on the optical disk 11.

The recording/reproducing apparatus includes the disk drive 12 having an optical system and driving system, the data processor 19, a temporal storage section 20 and an STC (System Time Counter or System Time Clock) 21. These elements form a section for writing and reading (recording and reproducing) data to and from the optical disk 11.

The temporal storage section 20 is used to buffer a predetermined amount of data included in the data that is output from the encoder section 14 and written to the optical disk 11 via the data processor 19 and disk drive 12, or to buffer a predetermined amount of data included in the data that is read from the optical disk 11 by the disk drive 12 and input to the decoder section 15 via the data processor 19.

Under the control of the microcomputer block 16, the data processor 19 supplies the disk drive 12 with to-be-recorded data output from the encoder section 14, fetches data read from the optical disk 11 by the disk drive 12, rewrites management information recorded on the optical disk 11, or deletes data recorded on the optical disk 11.

The microcomputer block 16 includes an MPU (Micro Processing Unit) [or a CPU (Central Processing Unit)], a rewritable ROM storing a control program, a RAM (Random Access Memory), and a built-in memory 16a for storing programming data.

The MPU of the microcomputer block 16 receives operation information from a key input section 22, and controls all operations of the apparatus on the basis of the control program stored in the ROM, using the RAM as a work area.

Those of the operations, which are related to the characterizing portion of the present invention, are a record programming (video record programming) operation and programmed-disk creating operation, etc.

The contents to be informed of to the user, which are included in the execution results of the microcomputer block 16, are displayed on a display unit 23 or monitor display (not shown) (OSD (On Screen Display)).

The timings of the microcomputer block 16 for controlling the disk drive 12, data processor 19, encoder section 14 and decoder section 15, etc. are determined on the basis of time data output from the STC 21.

The decoder section 15 comprises a separation section 15a for separating main picture data, sub-picture data and audio data from data read from the optical disk 11 by the disk drive 12 and input via the data processor 19; memory 15b used for a separation process executed by the separation section 15a, or for other signal processes; decoder group 15c including a V decoder for decoding main picture data separated by the separation section 15a, SP decoder for decoding sub-picture data separated by the separation section 15a, and an A decoder for decoding audio data separated by the separation section 15a; and video processor 15d for appropriately synthesizing main picture data acquired from the V decoder, and sub-picture data acquired from the SP decoder, and displaying a main picture and sub picture superposed on each other.

The output of the video processor 15d is input to a video mixer 24. The video mixer 24 executes synthesis of text data. The video mixer 24 is connected to a line for directly fetching a signal from the A/V input section 17 or TV tuner 18. The video mixer 24 is also connected to a frame memory 25 used as a buffer.

When generating a digital output, the mixer 24 generates an output to the outside via an I/F (Inter/Face) 26. Further, when generating an analog output, the mixer 24 generates an output to the outside via a DAC (Digital to Analog Converter) 27.

Similarly, when generating a digital output, the A decoder generates an output to the outside via an I/F 28. Further, when the A decoder generates an analog output, the output is first subjected to analog conversion executed by a DAC 30 via a selector 29, and is then generated to the outside.

The selector 29 can select the output of the ADC 14a on the basis of a select signal from the microcomputer block 16, in order to directly monitor a signal output from the A/V input section 17 or TV tuner 18.

FIG. 2 is a flowchart useful in explaining an operation for creating a programmed disk in the embodiment. After starting the operation (step S11), the user operates the key input section 22 to input programming data at a step S12. At a step S13, the microcomputer block 16 records the input programming data into the built-in memory 16a provided for the execution of the record programming function.

At a step S14, the microcomputer block 16 determines whether or not the input programming data is for the execution of programming on a to-be-programmed disk. If it determines that the data is not for the execution of programming on a to-be-programmed disk (if the answer is NO), it determines to execute usual record programming, thereby terminating the routine (step S20).

If, on the other hand, it determines at the step S14 that the programming data is for the execution of programming on a to-be-programmed disk (if the answer is YES), the microcomputer block 16 determines at a step S15 whether or not a disk is inserted. If it determines that no disk is inserted (if the answer is NO), it displays a message to induce the user to insert a disk on the display unit 23 or monitor display at a step S16, and returns the routine to the step S15.

On the other hand, if it determines at the step S15 that a disk is inserted (if the answer is YES), the microcomputer block 16 transfers, at a step S17, the programming data stored in the built-in memory 16a, to the disk as a to-be-programmed disk, thereby storing it on the disk.

After that, at a step S18, the microcomputer block 16 sets, to "programmed disk", a flag as an identifier indicative of the type of programming of the programming data stored in the built-in memory 16a.

If display of a list of programming data stored in the built-in memory 16a is requested at a step S19, the microcomputer block 16 displays, for example, an icon for the programming data with the flag set to "programmed disk", so as to discriminate the data, thereby terminating the routine (step S20).

Figure 3:
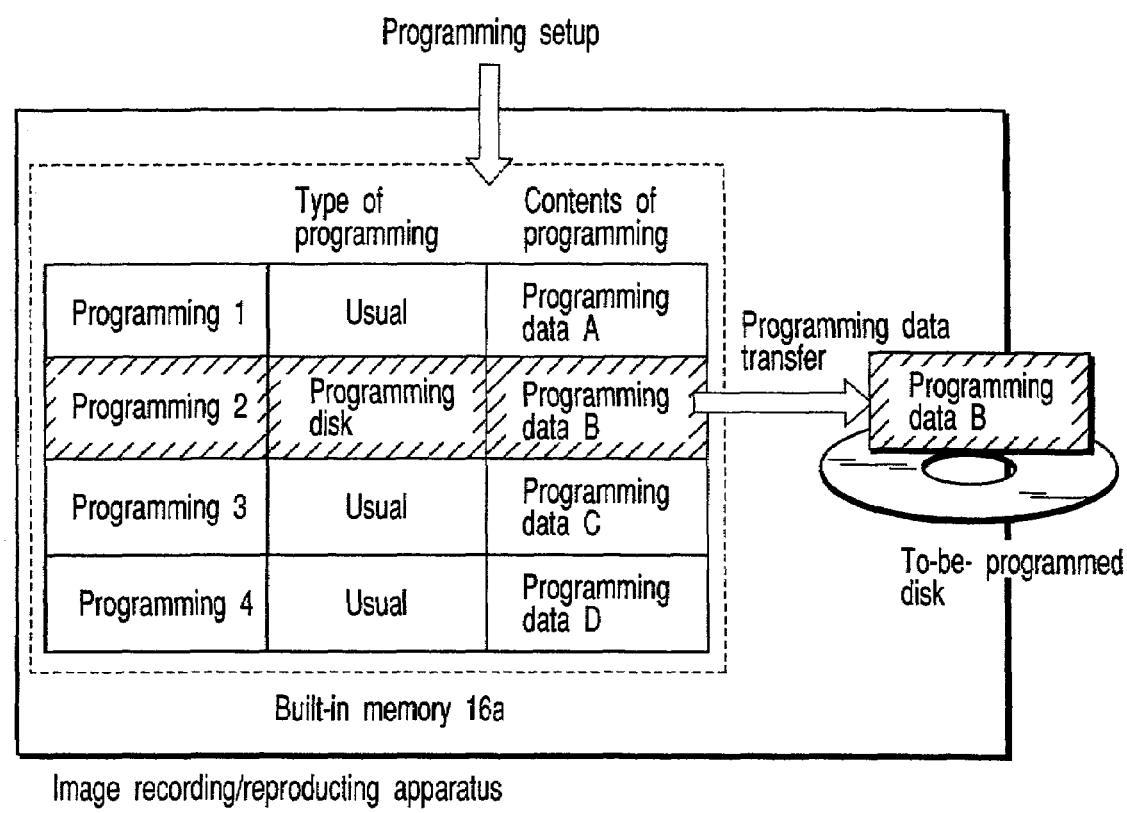
FIG. 3 is a view useful in explaining the storage contents of a built-in memory incorporated in the embodiment.

FIG. 3 shows the programming-data-recorded state of the built-in memory 16a. As shown, the built-in memory 16a includes a "programmed contents" area for recording a plurality of (four in the shown case) programming data items A-D, and a "programming type" area for recording the flag indicative of whether each programming data item A-D is for usual record programming or for record programming to a programmed disk.

When inputting programming data, the user also sets a flag indicative of the type of programming. As a result, programming data B with the programming-type-indicating flag set to "programmed disk" is transferred to and recorded on a disk. At this time, the programming data B is also kept in the built-in memory 16a without being deleted.

FIG. 4 shows an example of a list of the programming data stored in the built-in memory 16a. The one of the programming data items, to which icon ⊙ is attached at its left end in FIG. 4, is programming data recorded on a programmed disk. The microcomputer block 16 displays the icon when it has referred to the programming-type-indicating flag in the built-in memory 16a.

The contents of programming data include a broadcast channel, a recording date, a recording start/end time, an image quality, a recording rate, a sound quality, a recording medium, etc.

Figure 5:
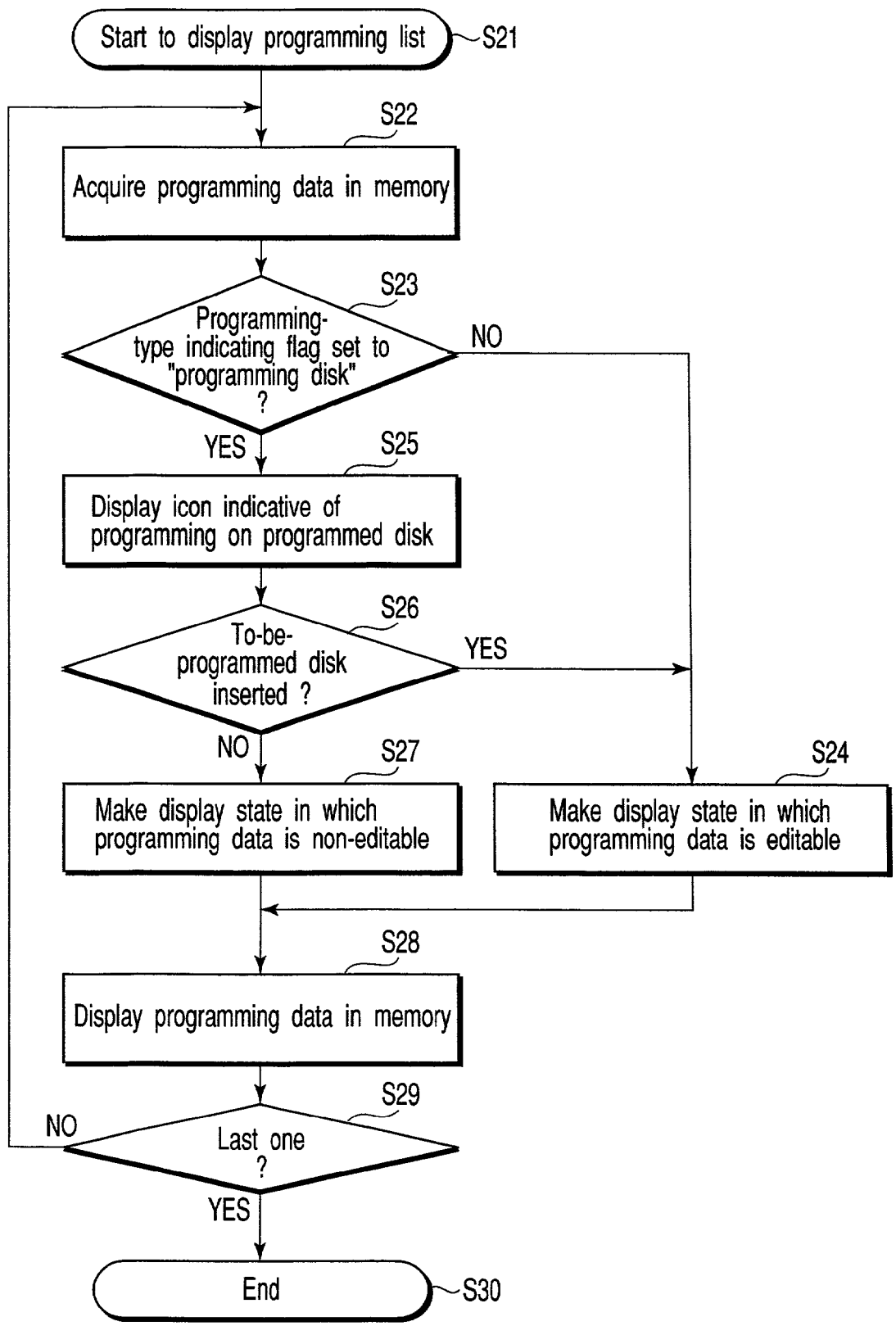
FIG. 5 is a flowchart useful in explaining an operation for listing the programming data in the embodiment.

FIG. 5 is a flowchart useful in explaining an operation for listing the programming data stored in the built-in memory 16a, as shown in FIG. 4. Firstly, after starting the operation (step S21), the microcomputer block 16 reads one programming data item from the built-in memory 16a at a step S22, and determines at a step S23 whether or not the programming-type flag corresponding to the programming data is the "programmed disk".

If it determines that the programming-type flag is not the "programmed disk" (if the answer is NO), the microcomputer block 16 makes the programming data editable at a step S24.

If it determines at the step S23 that the programming-type flag is the "programmed disk" (if the answer is YES), the microcomputer block 16 makes, indicatable at a step S25, the icon indicating that the programming data is for a programmed disk. At a step S26, it determines whether or not a to-be-programmed disk is inserted.

If it determines that a to-be-programmed disk is inserted (if the answer is YES), the microcomputer block 16 proceeds to a step S24, where it makes the programming data editable. If the programming data is edited, the resultant new programming data is recorded in the built-in memory 16a, and is also transferred to and recorded on the to-be-programmed disk.

On the other hand, if it determines at the step S26 that no to-be-programmed disk is inserted (if the answer is NO), the microcomputer block 16 proceeds to a step S27, where it makes the programming data non-editable.

After the step S24 or S27, the microcomputer block 16 displays, at a step S28, one programming data item read from the built-in memory 16a at the step S22.

Thereafter, the microcomputer block 16 determines at a step S29 whether or not the programming data item is the last one. If it is determined that the item is not the last one (if the answer is NO), the routine is returned to the step S22, whereas if the item is determined to be the last one (if the answer is YES), the routine is terminated (step S30).

Figure 6:
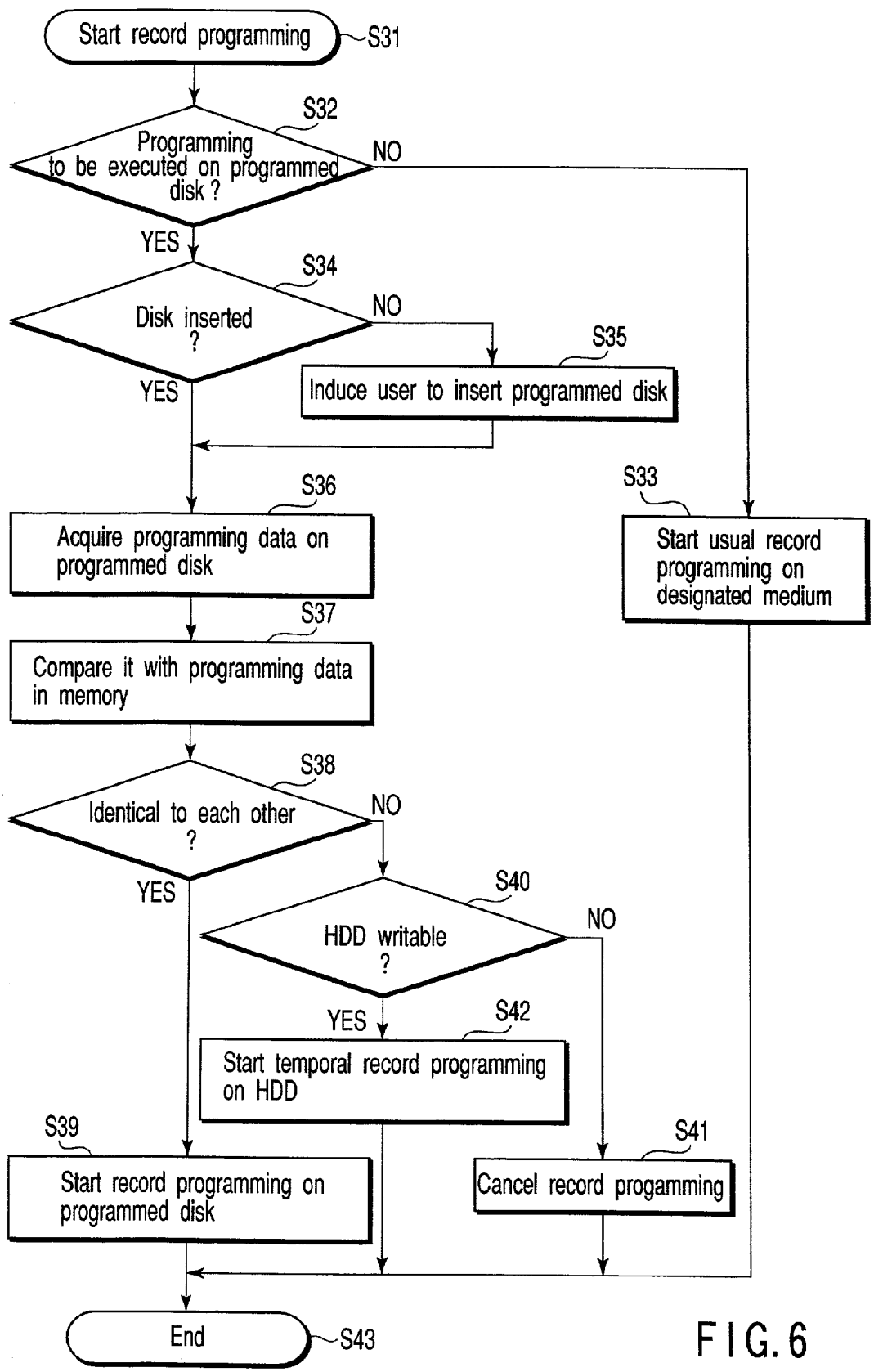
FIG. 6 is a flowchart useful in explaining a record programming operation in the embodiment.

FIG. 6 is a flowchart useful in explaining the record programming operation. After starting the operation (step S31), the microcomputer block 16 determines at a step S32 whether or not programming data read from the built-in memory 16a is for the execution of programming on a programmed disk.

If it is determined that the data is not for the execution of programming on a programmed disk (if the answer is NO), the microcomputer block 16 determines at a step S33 that usual record programming is to be executed, thereby executing usual record programming on a designated record medium, and terminates the routine (step S43).

If it determines at the step S32 that the programming data read from the built-in memory 16a is for the execution of programming on a programmed disk (if the answer is YES), the microcomputer block 16 determines at a step S34 whether or not a programmed disk is inserted. If it determines that no disk is inserted (if the answer is NO), it displays a message to induce the user to insert a disk on the display unit 23 or monitor display at a step S35.

After the step S35, or if it determines at the step S34 that a programmed disk is inserted (if the answer is YES), the microcomputer block 16 reads programming data recorded on the programmed disk at a step S36, and compares it with the programming data recorded in the built-in memory 16a at a step S37.

At a step S38, the microcomputer block 16 determines whether or not the programming data on the programmed disk is identical to corresponding programming data in the built-in memory 16a. If it determines that they are identical (if the answer is YES), it executes record programming on the programmed disk at a step S39, thereby terminating the routine (step S43).

If it determines at the step S38 that the programming data on the programmed disk is not identical to the corresponding programming data in the built-in memory 16a (if the answer is NO), the microcomputer block 16 determines at a step S40 whether or not the hard disk is writable. If it determines that the hard disk is not writable (if the answer is NO), it cancels the programming operation at a step S41, and terminates the routine (step S43).

Further, if it determines at the step S40 that the hard disk is writable (if the answer is YES), the microcomputer block 16 executes record programming on the hard disk at a step S42 on the basis of the programming data stored in the built-in memory 16a, thereby terminating the routine (step S43).

In the above-described embodiment, since programming data recorded on a programmed disk is also stored in the built-in memory 16a of the recording/reproducing apparatus, and the contents of the built-in memory 16a are displayed as a list, programming data for a programmed disk can be confirmed, as well as that for usual record programming, even if the programmed disk is not inserted. Thus, programming data can be managed in a centralized manner, which is very convenient for users.

Further, a programming-type flag, which indicates whether programming data is for usual record programming or record programming executed on a programmed disk, is set for each programming data item stored in the built-in memory 16a. An icon is attached to a programming data item for a programmed disk included in a displayed list of programming data items, thereby distinguishing it from the programming data for usual record programming. This structure makes centralized management more efficient for users.

In addition, when a list of programming data items is displayed, if a programmed disk corresponding to programming data for record programming executed on a programmed disk is not inserted, the programming data is made non-editable on a display. This prevents programming data from being unintentionally changed, thereby eliminating a problem in which programming data in the built-in memory 16a is not identical to that recorded on a programmed disk.

Moreover, when a record programming operation is executed, if programming data in the built-in memory 16a is not identical to that recorded on a programmed disk, programming is executed on the hard disk on the basis of programming data in the built-in memory 16a. Accordingly, even if a user has inserted the wrong programmed-disk by mistake, the program they want to record is reliably recorded.

In this case, the program recorded in the hard disk can be manually transferred to a corresponding programmed-disk, if the user later inserts the disk and uses a double recording (dubbing) function incorporated in the recording/reproducing apparatus.

Programming data input by a user can be stored in the RAM of the microcomputer block 16 in place of the built-in memory 16a. In this case, it is necessary to shift the programming data stored in the RAM, into the ROM of the microcomputer block 16 at a predetermined timing, thereby achieving a stabilized storage.

As described above in detail, in the invention, both programming data for usual record programming, and programming data for record programming using a specified recording medium such as a programmed disk can be managed in a centralized manner, which is very convenient for users. This is effective when used, for example, in a recording/reproducing apparatus in which users can simultaneously operate a rewritable optical disk and hard disk.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording/reproducing apparatus having a record programming function for recording a broadcasting program on a recording medium on the basis of input programming data, the input programming data being recorded on the recording medium, thereby making the recording medium to be dedicated to record programming based on the recorded programming data, the recording/reproducing apparatus comprising:

programming data recording means for recording input programming data items in a memory contained in the apparatus;

programming data record control means for reading that one of the programming data items recorded in the memory by the programming data recording means, which is requested to be recorded onto the recording medium, thereby transferring it to the recording medium and recording it thereon, and the programming data item read from the memory and transferred onto the recording medium by the programming data record control means is also maintained in the memory;

wherein the programming data record control means attaches, to the programming data recorded in the memory by the programming data recording means, an identifier which distinguishes the programming data item requested to be recorded onto the recording medium, from a programming data item which is not requested to be recorded onto the recording medium;

further comprising display means for displaying a list of the programming data recorded in the memory by the programming data recording means, on the basis of the identifier attached by the programming data record control means, such that the programming data item requested to be recorded onto the recording medium is distinguished from the programming data item which is not requested to be recorded onto the recording medium; and wherein when displaying the programming data item requested to be recorded onto the recording medium, the display means displays it in a non-editable state if the recording medium is not inserted.

* * * * *